United States Patent Office 3,109,742
Patented Nov. 5, 1963

3,109,742
STRUCTURAL CLAY AND METHOD
Ellis Gray King and Carl Adolphson, Bellingham, Wash., assignors to Puget Sound Pulp & Timber Co., Bellingham, Wash., a corporation of Delaware
No Drawing. Filed July 22, 1960, Ser. No. 44,530
27 Claims. (Cl. 106—72)

This invention relates to ceramics and has particular reference to improved structural clay products and methods for preparing the same.

This application is a continuation-in-part of our copending application Serial No. 433,794, filed June 1, 1954, and now abandoned, on "Process of Improving the Effectiveness of the Components of Spent Sulfite Liquor and the Products Thereof." Said application discloses novel dispersing agents including salts of sulfonated lignin-containing materials such as spent sulfite liquor, the salts having a cation selected from the group consisting of iron, aluminum, chromium, copper and mixtures thereof, as well as such salts of oxidized lignosulfonates, and oxidized lignosulfonates per se. Such materials, including said salts or complexes, are further disclosed in our U.S. Patents Nos. 2,935,473 and 2,935,504. The present invention relates to the use of these dispersing agents as additives to the clay mix utilized in the manufacture of structural ceramic products such as brick and tile.

A primary object of the present invention is to provide novel ceramic compositions and products containing specially selected sulfonated lignin-containing materials.

Another object of the present invention is to provide structural clay mixes of reduced water requirements, resulting in greater green or pre-fired strengths of products made therefrom, reduction in extrusion power requirement and increase in rate of extrusion.

Other objects and advantages of the present invention it is believed will be readily apparent from the following detailed description of preferred embodiments thereof.

Briefly, this invention comprehends within its scope the discovery that greatly improved ceramic compositions are provided by the addition to the clay mix of the water soluble lignosulfonate materials herein disclosed. The sulfonated lignin materials useful in the present invention are fully disclosed in the above-identified application and patents, the disclosures thereof being incorporated herein by reference. Briefly, these materials comprise: (1) the iron, aluminum, chromium or copper salts, or mixtures of these salts, of sulfonated lignin-containing materials such as those obtained from the pulping of wood and other lignocellulosic material, for example, spent sulfite liquor obtained from the pulping of wood by the neutral and acid bisulfite process, sulfonated Kraft process lignin and sulfonated soda lignin; (2) oxidized salts of the same categories; (3) such sulfonated lignin-containing materials which have been oxidized without the formation of the named salts; and (4) alkali treated sulfonated lignin-containing materials, including spent sulfite liquor as well as the materials of categories (1), (2) and (3). Oxidation is accomplished by reaction of the sulfonated lignin-containing material or salt thereof with an oxidizing agent having an oxidation power stronger than an oxidation potential of about —1.3, such agents including hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

The additives of the present invention effectively reduce the amount of water required to make a clay extrusion mix, providing the following valuable advantages: (1) increase in the strength of products in the green state with less losses during handling; (2) reduction in the extrusion power requirement and increase in the rate of extrusion; (3) reduction in losses by cracking and crazing during drying; and (4) minimized migration of the additive to the surface during drying as compared with unmodified spent sulfite liquor additives previously proposed.

As little as 0.01% of the additives of the present invention, based on the weight of the clay, can have an effect in reducing the water requirement of the clay. An amount greater than about 2% by weight of the clay is not usually commercially practicable and for most purposes smaller amounts produce effective results. The preferred range is between at least about 0.1% and about 1%. The additives are preferably added to the clay mix in the pug mill in dry powder form, but aqueous solutions thereof can be used.

The following specific examples are illustrative of the present invention, but it is to be understood that the invention is not to be limited to the specific details thereof:

In carrying out the examples, the clays used were typical of those used by structural clay products manufacturing companies in making brick and sewer tile. Each company has available to it certain clays of local origin which are mixed by experience to give an extrudable plastic mass. Slight variations are made in different plants, but the compositions perform more or less in the same manner and are affected in the same way by the additives of our invention.

The clays used in the examples were obtained directly from the manufacturers of these ceramic products and taken directly from their current production. These clays were as follows: Sewer Pipe Clay Mix obtained from Renton, Washington, in December 1954; Clay City Brick Mix obtained from Seattle, Washington, in October 1954, and Mica Sewer Pipe Mix obtained from Mica, Washington, in January 1955.

Each clay was ground; screened and mixed for 10 minutes in a laboratory model Simpson mixer. The additive samples described below were blended in during the mixing cycle either as a solution in water or as a dry powder. Water was then added to make the total concentration in the mix up to 20% including all water added and the water originally present in the clay, and the mixer was operated an additional 10 minutes to assure the uniform distribution of water and additive in the mass. The mass was then transferred to a Bonnot Beaver Laboratory extrusion unit fitted with a 1-inch diameter, circular cross-section die. All extrusions were made with a 27-inch vacuum applied to the equipment. The material was then extruded in bars, which were cut into 6-inch lengths. The bars were air dried for about 72 hours and then dried completely in an oven at about 105° C. Standard methods of determining dry and fired modulus of rupture and dry and fired shrinkage were used. Strength determinations were made using the 5000 lb. Tinius Olson testing machine and the average modulus of rupture for 5 bars was taken as the strength. Some of the dried test bars were fired in a laboratory scale kiln. The values obtained for the dry and fired modulus of rupture are given in the tables set forth below.

The several additives were prepared as follows:

SAMPLE NO. 1.—DICHROMATE OXIDIZED IRON SALT OF ALKALINE TREATED SPENT SULFITE LIQUOR

A 48% solution of calcium base fermented spent sulfite liquor solids (100 g. of solids) were digested for 8 hours at 90° C. in solution with sufficient sodium hydroxide to obtain a product with a pH of 8.0. This product was treated by adding a solution containing 20 grams of ferric sulfate in 75 cc. of water, heated to 80° C. and centrifuged to remove calcium sulfate, then a solution containing 4 grams of sodium dichromate in 15 cc. of water was added, and the solution heated to 90° C. The water was removed by evaporation and the solids reduced to dryness by heating on a steam bath.

SAMPLE NO. 2.—DICHROMATE OXIDIZED SODIUM SALT OF ACID TREATED ALKALINE TREATED SPENT SULFITE LIQUOR

Two thousand grams of concentrated fermented calcium base spent sulfite liquor having 50% by weight of non-volatile solids were heated to 90° C. and made alkaline to pH 8.0 by adding sodium hydroxide as a 50% solution. The temperature was maintained at 90° C. for 24 hours while adding hydroxide from time to time to maintain pH 8.0. The product was acidified to pH 2.0 by adding 300 g. of 16% sulfuric acid and heated for 2 hours at 95° C. and cooled. Sodium dichromate dihydrate (40 grams) was added at a 25% solution together with enough 16% sulfuric acid to adjust the pH to 3.7. Then 60.5 grams of sodium sulfate was added to base exchange the product to the sodium salt and remove the remaining calcium as calcium sulfate. The product mixture was heated to 90° C., centrifuged to remove calcium sulfate and dried at 60° C.

SAMPLE NO. 3.—DICHROMATE OXIDIZED CALCIUM SALT OF ACID TREATED ALKALINE TREATED SPENT SULFITE LIQUOR

The procedure was the same as sample No. 2 but the sodium sulfate addition was omitted.

SAMPLE NO. 4.—DICHROMATE OXIDIZED SODIUM SALT OF A HIGH MOLECULAR WEIGHT FRACTION OF SPENT SULFITE LIQUOR

A high molecular weight calcium lignosulfonate having a diffusion coefficient of 7.4 mm.$^2$/day (method described by Felicetta, Markham, Peniston and McCarthy, J.A.C.S. 71, 2879, 1949), representing the highest molecular weight (21%) of a fermented spent sulfite liquor was prepared as follows:

A fermented spent sulfite liquor was first concentrated to 50% by weight of non-volatile solids by evaporation at about 32° C. The concentrated spent sulfite liquor was mixed with ethyl alcohol to a solvent mixture of 60 volume percent alcohol and the resulting viscous heavy phase was separated from the fluid lighter phase. The heavy phase was next washed in a countercurrent liquid-liquid extractor with a 60% ethyl alcohol–40% water mixture to remove sugars and low molecular weight lignosulfonates and thus to yield a product heavy phase, the solids of which analyzed about 4% of total reducing substances calculated as glucose and constituted approximately 52% by weight of the original sulfite spent liquor solids. This product was diluted to 30% non-volatile solids with water and then fractionated into several fractions by adding ethyl alcohol and separating the resulting viscous heavy phases.

The first heavy phase containing the highest molecular weight 21% of the fermented calcium base spent sulfite liquor was diluted with water and evaporated at about 60° C. to remove alcohol and recover the solids in dry form. Five hundred grams of the dry calcium lignosulfonate fraction were dissolved in water and oxidized by adding 10 grams of sodium dichromate dihydrate as a water solution with stirring. Next 356 grams of 16% sulfuric acid, equivalent to the calcium in the calcium lignosulfonate, were weighed out and sufficient added to lower the pH to 3.5. The remaining sulfuric acid was neutralized with sodium hydroxide and the resulting sodium sulfate solution was added to the lignosulfonate solution of pH 3.5. The mixture was heated to 90° C., centrifuged to remove calcium sulfate and dried in air at 60° C.

The following Tables I, II and III set forth the results of the specific examples:

Table I
TESTS OF SAMPLE NO. 1 IN MICA SEWER PIPE MIX

| Percent sample No. 1 in mixture | Dry modulus of rupture (lbs./sq. in.) | Fired modulus of rupture (lbs./sq. in.) |
|---|---|---|
| 0 | 937 | 3,189 |
| 0.5 | 1,538 | 4,696 |
| 1.0 | 1,737 | 4,580 |

Table II
TESTS OF SAMPLE NOS. 2 AND 4 IN SEWER PIPE MIX

| Percent sample No. 2 in mixture | Dry modulus of rupture (lbs./sq. in.) | Fired modulus of rupture (lbs./sq. in.) |
|---|---|---|
| 0 | 1,060 | 3,800 |
| 0.5 | 1,680 | 3,840 |
| 1.0 | 1,930 | 3,920 |

| Percent sample No. 4 in mixture | Dry modulus of rupture (lbs./sq. in.) | Fired modulus of rupture (lbs./sq. in.) |
|---|---|---|
| 0 | 1,060 | 3,860 |
| 0.5 | 1,210 | 4,770 |
| 1.0 | 1,620 | 4,140 |

Table III
TESTS ON SAMPLE NO. 3 IN CLAY BRICK MIX

| Percent sample No. 3 in mixture | Dry modulus of rupture (lbs./sq. in.) | Fired modulus of rupture (lbs./sq. in.) |
|---|---|---|
| 0 | 958 | 1,860 |
| 0.25 | 1,105 | 2,050 |
| 0.51 | 1,213 | 1,965 |
| 1.0 | 1,450 | 1,830 |

The above test results clearly show the very significant and unexpected improvement in strengths of products incorporating the additives of the present invention.

Having fully described our invention, it is to be understood that we do not wish to be limited to the details set forth, but our invention is of the full scope of the appended claims.

We claim:

1. A method for making structural clay products comprising the steps of incorporating in a structural clay mix an effective dispersing amount of a water soluble salt of a sulfonated lignin-containing material, said salt having a cation selected from the group consisting of iron, aluminum, chromium, copper and combinations thereof to form an incorporated product, and forming said incorporated product into a shaped article.

2. The method of claim 1 wherein said sulfonated lignin-containing material is obtained from spent sulfite liquor and wherein said salt is oxidized by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

3. The method of claim 1 wherein the cation is chromium.

4. The method of claim 2 wherein the cation is iron and the oxidizing agent is an alkali metal chromate.

5. The method of claim 2 wherein the cation is chromium and the oxidizing agent is an alkali metal chromate.

6. The method of claim 1 wherein the salt is oxidized.

7. A method for making structural clay products comprising the steps of incorporating in a structural clay mix an effective dispersing amount of a water soluble, oxidized sulfonated lignin-containing material, said material oxidized with an oxidizing agent having an oxidizing power stronger than an oxidation potential of about −1.3 to form an incorporated product, and forming said incorporated product into a shaped article.

8. The method of claim 6 wherein the sulfonated lignin-containing material is alkaline treated.

9. The method of claim 6 wherein the sulfonated lignin-containing material is acid and alkaline treated.

10. The method of claim 6 wherein the sulfonated lignin-containing material is a high molecular weight fraction of spent sulfite liquor.

11. The method of claim 7 wherein said sulfonated lignin-containing material is obtained from spent sulfite liquor and wherein said oxidizing agent is selected from the group consisting of hydrogen peroxide, ozone, lead dioxide, chromic acid, chlorine alkali and alkaline earth metal hypochlorites, alkali metal chromate, alkali metal permanganate, alkali metal persulfate, alkali metal perborate, electrolytic oxidation and combinations thereof.

12. A shaped clay article having uniformly dispersed therein a water soluble salt of a sulfonated lignin-containing material, said salt having a cation selected from the group consisting of iron, aluminum, chromium, copper and combinations thereof.

13. The article of claim 12 wherein said sulfonated lignin-containing material is obtained from spent sulfite liquor and wherein said salt is oxidized by an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, electrolytic oxidation and combinations thereof.

14. The article of claim 12 wherein the cation is chromium.

15. The article of claim 13 wherein the cation is iron and the oxidizing agent is an alkali metal chromate.

16. The article of claim 13 wherein the cation is chromium and the oxidizing agent is an alkali metal chromate.

17. The article of claim 12 wherein the salt is oxidized.

18. A shaped clay article having uniformly dispersed therein an effective dispersing amount of a water soluble, oxidized sulfonated lignin-containing material, said material oxidized with an oxidizing agent having an oxidizing power stronger than an oxidation potential of about −1.3.

19. The article of claim 17 wherein the sulfonated lignin-containing material is alkaline treated.

20. The article of claim 17 wherein the sulfonated lignin-containing material is acid and alkaline treated.

21. The article of claim 17 wherein the sulfonated lignin-containing material is a high molecular weight fraction of spent sulfite liquor.

22. The article of claim 18 wherein said sulfonated lignin-containing material is obtained from spent sulfite liquor and wherein said oxidizing agent is selected from the group consisting of hydrogen peroxide, ozone, lead dioxide, chromic acid, chlorine alkali and alkaline earth metal hypochlorites, alkali metal chromate, alkali metal permanganate, alkali metal persulfate, alkali metal perborate, electrolytic oxidation and combinations thereof.

23. The method of claim 1 wherein said salt is oxidized with an alkali metal dichromate.

24. The method of claim 7 wherein said oxidizing agent is an alkali metal dichromate.

25. The article of claim 12 wherein said salt has been oxidized by an alkali metal dichromate.

26. The article of claim 18 wherein said oxidizing agent is an alkali metal dichromate.

27. A shaped clay article having uniformly dispersed therein a water soluble sulfonated lignin-containing material in combination with a metal selected from the group consisting of iron, aluminum, chromium, copper and mixtures thereof.

References Cited in the file of this patent
UNITED STATES PATENTS

| | | |
|---|---|---|
| 2,833,659 | Bauer | May 6, 1958 |
| 2,935,473 | King et al. | May 3, 1960 |
| 2,935,504 | King et al. | May 3, 1960 |